United States Patent
Yuan et al.

(10) Patent No.: US 11,434,306 B2
(45) Date of Patent: Sep. 6, 2022

(54) **LOW-MOLECULAR-WEIGHT *TREMELLA AURANTIALBA* GLUCURONOXYLOMANNAN AS WELL AS PREPARATION METHOD AND APPLICATION THEREOF**

(71) Applicant: GUANGXI UNIVERSITY OF CHINESE MEDICINE, Guangxi (CN)

(72) Inventors: Qingxia Yuan, Guangxi (CN); Longyan Zhao, Guangxi (CN); Hong Li, Guangxi (CN); Ziyi Wei, Guangxi (CN)

(73) Assignee: GUANGXI UNIVERSITY OF CHINESE MEDICINE, Guangxi (CN)

( * ) Notice: Subject to any disclaimer, the term of this patent is extended or adjusted under 35 U.S.C. 154(b) by 0 days.

(21) Appl. No.: 17/429,908

(22) PCT Filed: Jan. 6, 2021

(86) PCT No.: PCT/CN2021/070461
§ 371 (c)(1),
(2) Date: Aug. 10, 2021

(87) PCT Pub. No.: WO2021/143595
PCT Pub. Date: Jul. 22, 2021

(65) Prior Publication Data
US 2022/0041762 A1    Feb. 10, 2022

(30) Foreign Application Priority Data

Jan. 19, 2020    (CN) .......................... 202010061256.9

(51) Int. Cl.
*C08B 37/00* (2006.01)
*B01J 31/02* (2006.01)

(52) U.S. Cl.
CPC ......... *C08B 37/006* (2013.01); *B01J 31/0205* (2013.01); *C08B 37/0003* (2013.01)

(58) Field of Classification Search
None
See application file for complete search history.

(56) References Cited

FOREIGN PATENT DOCUMENTS

| CN | 1227495 A | 9/1999 |
|----|-----------|--------|
| CN | 1947722 A | 4/2007 |
| CN | 111234044 A | 6/2020 |

OTHER PUBLICATIONS

Perera, Namal et al. "Carboxylic and O-acetyl moieties are essential for the immunostimulatory activity of glucuronoxylomannan: a novel TLR4 specific immunostimulator from Auricularia auricula-judae." Chem. Commun. 54 (2018), May 18, 2018. pp. 6995-6998 (5 pages).
Yuan, Qingxia et al. "Immunoenhancing glucuronoxylomannan from Tremella aurantialba Bandoni et Zang and its low-molecular-weight fractions by radical depolymerization: Properties, structures and effects on macrophages." Carbohydrate Polymers 238 (2020), Mar. 18, 2020, pp. 1-9 (9 pages).
Du, Xiuju et al. "Structural elucidation and antioxidant activity of a novel polysaccharide (TAPB1) from Tremella aurantialba." Food Hydrocolloids 43 (2015), Jul. 30, 2014, p. 459-464 (6 pages).
Du, Xiuju et al. "Structural elucidation and immuno-stimulating activity of an acidic heteropolysaccharide (TAPA1) from Tremella aurantialba." Carbohydrate Research 344 (2009), Feb. 14, 2009, pp. 672-678 (7 pages).
Reshetnikov, Sergey V. "Medicinal Value of the Genus *Tremella* Pers. (Heterobasidiomycetes) (Review)." International Journal of Medicinal Mushrooms, vol. 2, (2000), pp. 169-193 (26 Pages).
First Office Action for Chinese Priority Application 202010061256.9 dated Feb. 3, 2021 (3 pages).
Written Opinion (English and Chinese) of the International Searching Authority issued in PCT/CN2021/070461, dated Mar. 26, 2021; ISA/CN (10 pages).
International Search Report (English and Chinese) of the International Searching Authority issued in PCT/CN2021/070461, dated Apr. 1, 2021; ISA/CN (8 pages).

*Primary Examiner* — Layla D Berry
(74) *Attorney, Agent, or Firm* — Harness, Dickey & Pierce, P.L.C.

(57) ABSTRACT

The present disclosure provides a low-molecular-weight *Tremella aurantialba* glucuronoxylomannan (LTAG) as well as a preparation method and an application thereof, and specifically relates to the technical field of medicine. The LTAG provided in the present disclosure has a weight-average molecular weight of 8,000-24,000 Da. In the method of preparing LTAG as provided in the present disclosure, *Tremella aurantialba* glucuronoxylomannan is depolymerized by peroxides so as to get low-molecular-weight products, which are then exchanged into pharmaceutically acceptable salts through cation exchange resins. The resulting LTAG has a clear structure, a low viscosity and a good solubility, has a strong immune-enhancing activity, and is capable of acting on TLR4 receptor-activated macrophagocytes and promoting the production of various immune factors, so it can be used in the prevention and/or treatment of immunodeficiency-related diseases.

19 Claims, 15 Drawing Sheets

LOW-MOLECULAR-WEIGHT *TREMELLA AURANTIALBA* GLUCURONOXYLOMANNAN AS WELL AS PREPARATION METHOD AND APPLICATION THEREOF

CROSS REFERENCE TO RELATED APPLICATION(S)

This application is a U.S. National Phase Application under 35 U.S.C. 371 of International Application No. PCT/CN2021/070461, filed on Jan. 6, 2021, which claims the priority of Chinese Patent Application No. 202010061256.9, entitled "low-molecular-weight Tremella aurantialba glucuronoxylomannan as well as preparation method and application thereof", filed to China National Intellectual Property Administration on Jan. 19, 2020. The entire disclosures of the above applications are expressly incorporated by reference herein.

TECHNICAL FIELD

The present disclosure relates to the technical field of medicine, and particularly relates to a low-molecular-weight *Tremella aurantialba* glucuronoxylomannan as well as a preparation method and an application thereof.

BACKGROUND ART

Immunodeficiency or immune system disorders are closely related to the occurrence and development of a series of diseases (metabolic syndromes including obesity and type 2 diabetes mellitus, tumors and the like). Immunomodulators can effectively enhance the host defense response, improve the body's resistance, prevent disease attacks, enhance and improve body constitution, thus bringing new hope for the prevention and treatment of many diseases and playing positive roles in preventing and controlling a series of major health problems. Therefore, it is still the focus of new drug development to research and develop immunomodulators with significant efficacy and small toxicity and side effects. Some natural immunomodulators have been widely used, for example, Ginseng polysaccharides, mannatide, tripterygium glycosides, and the like.

Fungi polysaccharides are a class of active substances extracted from fungal fruiting bodies, mycelium or their fermentation broth. It has been confirmed that fungi polysaccharides have the efficacies of lowering blood lipid, immunomodulation, antivirus and antitumor, and have negligible toxicity and side effects, i.e., safe and reliable. Particularly, the immunomodulatory activity is of great concern, so they are honored as "natural immune enhancers". Currently, some fungi polysaccharides, e.g., Lentinan, Schizophyllan, Krestin, Polyporus polysaccharide and the like, have been applied in clinic, which can effectively improve the body's immune function and enhance the immunity, and reduce the side effects of chemoradiotherapy as the adjuvant antitumor therapeutic agents.

*Tremella aurantialba* (*Tremella aurantialba* Bandoni et Zang) is a kind of fungus belonging to Basidiomycotina Hymenomycetes Tremella, a precious edible and medicinal fungus. Modern researches have shown that *Tremella aurantialba* is rich in protein, amino acid, polysaccharide and other nutrients and active constituents. Especially the content of polysaccharide is striking, which accounts for 60-70% of the dry weight of fruiting bodies, far higher than the proportion of polysaccharide in other edible fungi. Where, glucuronoxylomannan is a kind of acidic polysaccharide constituted from glucuronic acid, xylose, and mannose, which exists in the fruiting bodies of *Tremella aurantialba* (Food Hydrocolloid, 2015, 43: 459-64; Carbohydr Res, 2009, 344(5): 672-678), and is also found in *Tremella fuciformis, Exidia auricula Judae* and other fungi (Int J Med Mushrooms, 2, 169-93; Chem Commun, 2018, 54(51), 6995-6998), but the structure of glucuronoxylomannan from different species varies greatly. Natural *Tremella aurantialba* glucuronoxylomannan (TAG) has the effects of enhancing the immunity, lowering blood lipid, antitumor, protecting the liver, antioxidation, and other biological activities, and in particular, it has strong immune-enhancing activity.

However, natural TAG still has some pharmaceutically unacceptable physical properties, for example, high viscosity and poor solubility. Appropriately depolymerized oligomeric TAG can retain the immune-enhancing activity of natural TAG, and the viscosity is reduced and the solubility is enhanced significantly. Therefore, the druggability would be excellent. Relevant researches in this field have shown that degradation of polysaccharides by acid hydrolysis has no selectivity, the basic structure of original polysaccharide cannot be retained, the structure of polysaccharide is damaged greatly, and it is difficult to control the conditions of acid hydrolysis and the quality of depolymerized products. Due to the special chemical structure of TAG, it is difficult to apply the commonly used depolymerizing methods of polysaccharides such as enzymatic depolymerization, acid or alkaline depolymerization in the depolymerization of TAG.

SUMMARY

The present disclosure is intended to provide a low-molecular-weight *Tremella aurantialba* glucuronoxylomannan as well as a preparation method and an application thereof. The low-molecular-weight *Tremella aurantialba* glucuronoxylomannan (LTAG) has strong immune-enhancing activity, and is capable of acting on TLR4 receptor-activated macrophagocytes and promoting the production of various immune factors, so it can be used in the prevention and/or treatment of immunodeficiency-related diseases.

In order to realize the above objectives, the present disclosure provides the following technical schemes:

The present disclosure provides a low-molecular-weight *Tremella aurantialba* glucuronoxylomannan (LTAG), which is a mixture of homologous glucuronoxylomannan derivatives, its structural formula is as below:

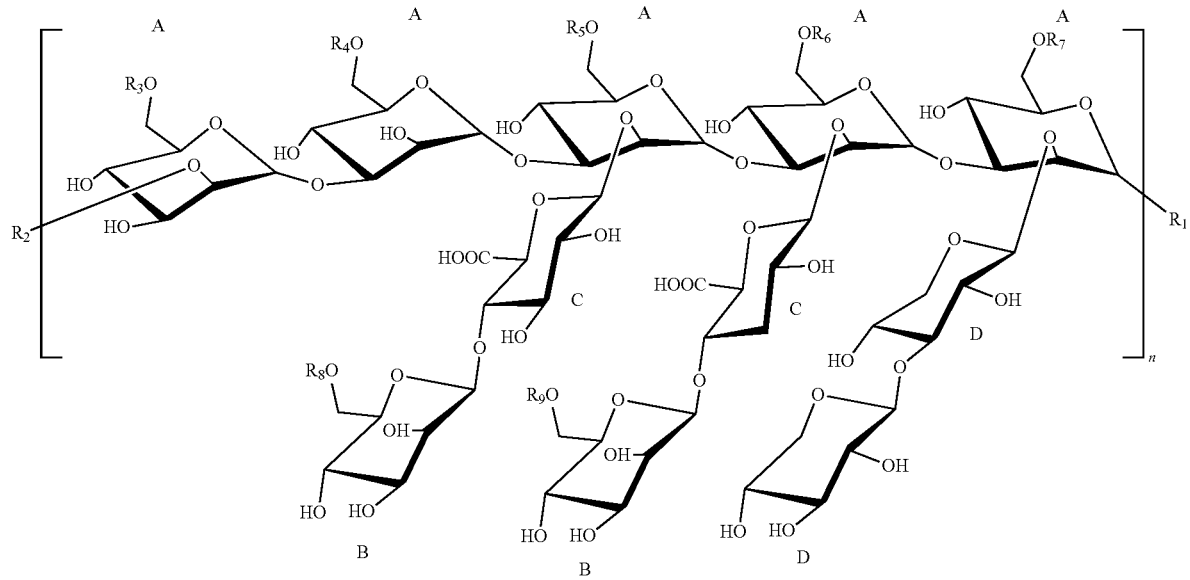

In the structural formula,
A is α-D-mannos-1-yl;
B is β-D-mannos-1-yl;
C is β-D-glucuron-1-yl;
D is β-D-xylos-1-yl;
$R_1$ is —OH or -2-O-α-D-mannose;
$R_2$ is —H or (1→2,3)-α-D-mannose;
$R_3$, $R_4$, $R_5$, $R_6$, $R_7$, $R_8$, $R_9$ are, independently of one another, —H or —COCH$_3$;
When $R_3$, $R_4$, $R_5$, $R_6$, $R_7$, $R_8$ and $R_9$ are all —H, the compound is a deacetylated derivative of the low-molecular-weight Tremella aurantialba glucuronoxylomannan.

The polydispersity index (PDI, the ratio of weight-average/number-average molecular weight, Mw/Mn) of the low-molecular-weight Tremella aurantialba glucuronoxylomannan of the present disclosure is generally between 1.0 and 2.0; preferably, the PDI of the low-molecular-weight Tremella aurantialba glucuronoxylomannan is between 1.1 and 1.6.

In the present disclosure, furthermore, on the basis of molar ratio, the molar ratio of the three monosaccharide residues, mannose (D-Man, corresponding to A and B in the above structural formula), glucuronic acid (D-GlcA, corresponding to C in the above structural formula) and xylose (D-Xyl, corresponding to D in the above structural formula), contained in the low-molecular-weight Tremella aurantialba glucuronoxylomannan to the contained —COCH$_3$ is 3:(1±0.3):(1±0.3):(0.5±0.05);

the mole number of —COCH$_3$ contained in the deacetylated derivative of the low-molecular-weight Tremella aurantialba glucuronoxylomannan is 0;

the n is an integer with a mean of 4-12.

In the present disclosure, furthermore, the low-molecular-weight Tremella aurantialba glucuronoxylomannan is the depolymerized products of Tremella aurantialba glucuronoxylomannan extracted from the Basidiomycotina Hymenomycetes Tremella Tremella aurantialba fruiting bodies, fermented mycelium or their fermentation broth.

In the present disclosure, furthermore, the weight-average molecular weight of the low-molecular-weight Tremella aurantialba glucuronoxylomannan is in a range of 8,000-24,000 Da.

In the present disclosure, furthermore, the weight-average molecular weight of the low-molecular-weight Tremella aurantialba glucuronoxylomannan is in a range of 10,000-20,000 Da.

In the present disclosure, furthermore, the weight-average molecular weight of the low-molecular-weight Tremella aurantialba glucuronoxylomannan is 19300 Da.

In the present disclosure, furthermore, the weight-average molecular weight of the low-molecular-weight Tremella aurantialba glucuronoxylomannan is 14700 Da.

In the present disclosure, furthermore, the mean value of n in the homologous glucuronoxylomannan derivative is 5-10.

In the present disclosure, furthermore, the viscosity of the low-molecular-weight Tremella aurantialba glucuronoxylomannan is between 0.05-0.50 dL/g. At such a viscosity, the low-molecular-weight Tremella aurantialba glucuronoxylomannan is soluble in water, and the druggability is excellent.

The present disclosure also provides a preparation method of the low-molecular-weight Tremella aurantialba glucuronoxylomannan, including the following steps:

(1) Extracting total polysaccharide of Tremella aurantialba, i.e., Tremella aurantialba glucuronoxylomannan from Basidiomycotina Hymenomycetes Tremella Tremella aurantialba fruiting bodies, fermented mycelium or their fermentation broth;

(2) Depolymerizing the Tremella aurantialba glucuronoxylomannan obtained from the step (1) with a peroxide, so as to obtain its low-molecular-weight depolymerized product, i.e., the low-molecular-weight Tremella aurantialba glucuronoxylomannan.

Tremella aurantialba glucuronoxylomannan (TAG) can be extracted from Tremella aurantialba with reference to a method well known in this field, which generally includes, but not limited to, the following steps: hot water extraction or enzymolysis to obtain an extracting solution; precipitation with ethyl alcohol and/or acetone to get crude polysaccharide extracts; then dialysis, ultrafiltration or gel filtration to remove small molecular weight impurities; purification by ion exchange chromatography (DEAE Sepharose Fast Flow), etc.; finally freeze-drying to obtain *Tremella aurantialba* glucuronoxylomannan (TAG).

In the present disclosure, furthermore, the depolymerization of *Tremella aurantialba* glucuronoxylomannan with a peroxide in the step (2) is carried out specifically as below: the *Tremella aurantialba* glucuronoxylomannan obtained from the step (1) is dissolved in deionized water to obtain an aqueous solution with a mass fraction of 0.05-10%, then a metal ion catalyst with a mass fraction of 0.05-0.5% and a peroxide with a mass fraction of 1-6% are added into the resulting aqueous solution and react at a temperature of 25-55 °C. During the reaction, a HPGPC detection is performed. When it is detected that the molecular weight of the depolymerized product reaches the weight-average molecular weight range, a metal ion chelator is added to terminate the reaction. The depolymerized product is then precipitated by adding ethyl alcohol or acetone and collected by centrifugation, and then desalted by ultrafiltration, dialysis or gel permeation chromatography, thus obtaining the low-molecular-weight *Tremella aurantialba* glucuronoxylomannan.

In the low-molecular-weight *Tremella aurantialba* glucuronoxylomannan (LTAG) prepared by the above method of the present disclosure, the compound in which $R^1$ is —OH can account for more than 90% the total amount of LTAG on the basis of molar percentage, when being calculated according to the $^1$H NMR spectrum of the product.

In the present disclosure, furthermore, the metal ion catalyst is cupric acetate; the peroxide is hydrogen peroxide.

The present disclosure also provides a method of preparing the deacetylated derivative of the low-molecular-weight *Tremella aurantialba* glucuronoxylomannan, including the following steps:

1) Extracting total polysaccharide of *Tremella aurantialba*, i.e., *Tremella aurantialba* glucuronoxylomannan from Basidiomycotina Hymenomycetes Tremella *Tremella aurantialba* fruiting bodies, fermented mycelium or their fermentation broth;

2) The *Tremella aurantialba* glucuronoxylomannan obtained from the step 1) is formulated into an aqueous solution with a mass fraction of 0.05-10%, into which is then added a NaOH solution with a final concentration of 0.05-0.5 M and reacted at a temperature of 10-40° C. for 0.5-6 h. At the end of the reaction, hydrochloric acid is added to adjust pH to 6.5-7.5, and small molecular weight impurities are removed through dialysis, ultrafiltration or gel column chromatography, thus obtaining the deacetylated derivative of the low-molecular-weight *Tremella aurantialba* glucuronoxylomannan.

*Tremella aurantialba* glucuronoxylomannan (TAG) can be extracted from *Tremella aurantialba* with reference to a method well known in this field, which generally includes, but not limited to, the following steps: hot water extraction or enzymolysis to get an extracting solution; precipitation with ethyl alcohol and/or acetone to get crude polysaccharide extracts; then dialysis, ultrafiltration or gel filtration to remove small molecular weight impurities; purification through ion exchange chromatography (DEAE Sepharose Fast Flow), etc.; finally freeze-drying to get *Tremella aurantialba* glucuronoxylomannan (TAG).

The present disclosure also provides an application of the low-molecular-weight *Tremella aurantialba* glucuronoxylomannan, that is, the above low-molecular-weight *Tremella aurantialba* glucuronoxylomannan, the deacetylated derivative of the low-molecular-weight *Tremella aurantialba* glucuronoxylomannan or the pharmaceutically acceptable salts of both are used for preparing immune enhancers.

In the present disclosure, furthermore, the pharmaceutically acceptable salts mean that the resulting products are converted into pharmaceutically acceptable salts through a cation exchange column.

The present disclosure also further provides a pharmaceutical composition of immune enhancers, which contains effective doses of LTAG and its deacetylated derivative of the present disclosure or pharmaceutically acceptable salts thereof, as well as medical excipients. Systemic delivery preparations, intravenous injection delivery preparations, intramuscular and/or subcutaneous injection delivery preparations can be selected for the pharmaceutical composition containing the low-molecular-weight *Tremella aurantialba* glucuronoxylomannan. Among these preparations, the preferable dosage forms of the pharmaceutical composition are freeze-dried powder for injection, aqueous solution for injection and the like.

Because LTAG of the present disclosure is a polysaccharide compound with good stability, so it can be used in combination with current available clinic drugs, including being administered simultaneously with existing drugs such as antitumor drugs, or being formulated into pharmaceutical composition preparations.

In the present disclosure, furthermore, all the above pharmaceutically acceptable salts may be organic ammonium salts, alkali metal salts or alkaline-earth metal salts of the low-molecular-weight *Tremella aurantialba* glucuronoxylomannan.

In the present disclosure, furthermore, all the above pharmaceutically acceptable salts may be calcium salts, sodium salts or potassium salts.

The present disclosure has the following beneficial effects:

1. It was firstly found in the present disclosure that, the low-molecular-weight *Tremella aurantialba* glucuronoxylomannan (LTAG) with strong immune-enhancing activity can significantly promote the proliferation of macrophagocytes within the experimental dosage range (12.5-200 µg/mL), and stimulate the macrophagocytes to release NO and secrete immune factors such as IL-1β and TNF-α in a dose-dependent manner. In addition, the present disclosure also found that, as an immune enhancer, the feature of the LTAG is to bind Toll-like receptor 4 ($TLR_4$) of cells. Because immune enhancers targeting the activation of macrophagocytes have become the key direction of research and development of immune-enhancing drugs, so the low-molecular-weight *Tremella aurantialba* glucuronoxylomannan (LTAG) of the present disclosure has important application value for the development of immune enhancers.

2. During the preparation of the low-molecular-weight *Tremella aurantialba* glucuronoxylomannan (LTAG) in the present disclosure, some pharmaceutically unacceptable physical properties, for example, high viscosity and poor solubility of natural *Tremella aurantialba* glucuronoxylomannan (TAG) have been overcome. In addition, the immune activity of the depolymerized product (LTAG) can be retained. Without basically reducing the immune activity, the molecular weight of the depolymerized product can be reduced, the structure of the compound is clearer, the viscosity is reduced, the solubility is improved, and the druggability is stronger.

3. The applicant has found through multiple tests that it is difficult to apply the commonly used depolymerizing methods of polysaccharides such as enzymatic depolymerization, acid or alkaline depolymerization in the depolymerization of *Tremella aurantialba* glucuronoxylomannan (TAG), which may be caused by the special chemical structure of TAG according to researches. In order to avoid the influence of the depolymerization process on the characteristic structure of TAG, a peroxide depolymerization method catalyzed with metal ions is employed in the present disclosure to realize the depolymerization of TAG. The test results show that, in addition to reducing the polymerization degree of structural units (the numerical value of n in the structure is reduced), this method does not affect the basic structure of the depolymerized product, e.g., the composition of monosaccharides, and the properties of repeated structural units, and does not affect the characteristic chemical functional groups such as acetyl, i.e., does not affect the general structural formula of the low-molecular-weight *Tremella aurantialba* glucuronoxylomannan.

4. In the low-molecular-weight *Tremella aurantialba* glucuronoxylomannan (LTAG) prepared by the above method of the present disclosure, the compound in which $R^1$ is —OH can account for more than 90% the total amount of LTAG on the basis of molar percentage, when being calculated according to the $^1H$ NMR spectrum of the product.

DETAILED DESCRIPTION OF THE EMBODIMENTS

Figure 1:
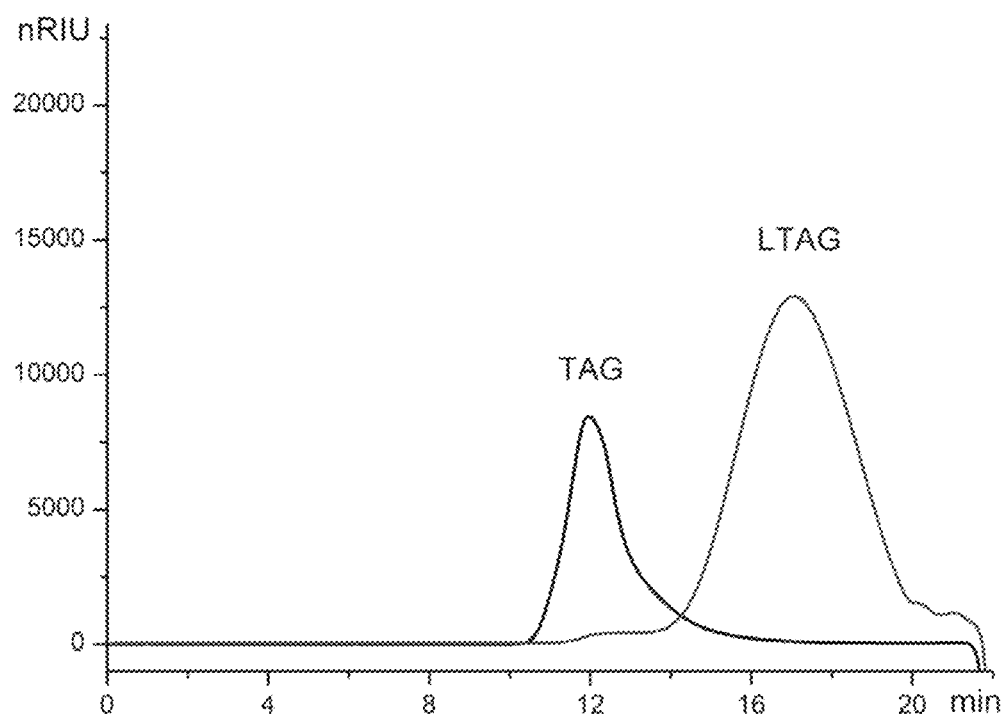
FIG. 1 shows HPGPC profiles of *Tremella aurantialba*-derived TAG and its low-molecular-weight product LTAG.

The low-molecular-weight *Tremella aurantialba* glucuronoxylomannan provided in the present disclosure as well as a preparation method and an application thereof will be illustrated in detail below in combination with the following embodiments, but they should not be construed as the limitation on the protection scope of the present disclosure.

Embodiment 1

Preparation of the Low-Molecular-Weight *Tremella aurantialba* Glucuronoxylomannan (LTAG)

1. Materials and Methods
(1) Materials
*Tremella aurantialba* (*Tremella aurantialba* Bandoni et Zang), commercial product;
The used reagents including $H_2O_2$, $Cu(CH_3COO)_2 \cdot H_2O$, NaCl, NaOH, ethyl alcohol and the like were all commercial analytically pure reagents.

(2) Methods
1) Preparation of *Tremella aurantialba* glucuronoxylomannan (TAG): fruiting bodies of *Tremella aurantialba* were dried, crushed, extracted, separated and purified to get TAG with a yield of 50.6%, a purity of 98% (HPGPC, Area normalization method), and a weight-average molecular weight (Mw) of $6.24 \times 10^5$ Da.

2) Preparation of low-molecular-weight *Tremella aurantialba* glucuronoxylomannan (LTAG): 2.0 g TAG obtained from step 1) was mixed with cupric acetate monohydrate in a reaction flask and dissolved with 20 mL distilled water in a water bath at 35° C., 10 mL $H_2O_2$ of 10% was dropwise added within 15 min, and during the reaction, a NaOH solution of 1 M was used to control the pH value in a range of 5.0-6.0. The reaction was continually stirred for about 0.5 h, and 40 mg EDTA-2Na was then added into the reaction solution to terminate the reaction. 120 mL anhydrous ethyl alcohol was added and centrifuged at 4000 rpm for 15 min to obtain precipitates. The resulting precipitates were dissolved with 20 mL water, exchanged into sodium salts through Dowex 50WX8 type cation exchange resin, dialyzed through a dialysis membrane with a molecular weight cut-off of 1000 Da for 24 hours, frozen and dried to get 1.66 g depolymerization sample LTAG-1, with a yield of 83.0%.

3) Detection on the physicochemical properties and structures of the resulting TAG and its depolymerized product LTAG-1: The content of glucuronic acid (D-GlcA) was detected by a sulfuric acid-carbazole method (Zhang Weijie, Biochemical Research Technology of Glycoconjugates. 2nd ed. Zhejiang: Zhejiang University Press, 1999, 11-21). The intrinsic viscosity was determined with an Ubbelohde viscometer following the viscosimetry in the General Chapters 0633 of the Chinese Pharmacopoeia 2015 Volume IV. The molecular weight and the distribution thereof were detected by a high-performance gel permeation chromatography (HPGPC). The composition of monosaccharides was detected by HPLC according to PMP derivatization procedures.

4) The linkage types of TAG polysaccharide were analyzed by methylation. AVANCE AV 600 nuclear magnetic resonance spectrometer (600 MHz) was used to detect the NMR spectra so as to resolve the sugar structure (Bruker Co., Switzerland, the solvent was $D_2O$ containing Trimethylsilyl-propionic acid (TSP-d4) as the internal standard, temperature 25° C.). The molar percentage of acetyl was calculated from the integral area of methyl peak in $^1H$ NMR.

2. Results:
The HPGPC detection spectra of TAG and its depolymerized product LTAG-1 were shown in FIG. 1, the composition of monosaccharides and the determination results of physicochemical parameters were shown in Table 1, 1D and 2D NMR detection spectra were shown in FIGS. 2-7, and the signal assignments of $^1H/^{13}C$ NMR spectrum data were shown in Table 2.

TABLE 1

Detection results of physicochemical parameters and the composition of monosaccharides of *Tremella aurantialba* fruiting bodies-derived TAG and LTAG-1

| Samples | Molecular weight (Mw, kDa) | Dispersion coefficient (PDI) | Intrinsic viscosity (0.1M NaCl, dL/g) | Content of uronic acid (%) | Composition of monosaccharides (molar ratio) D-Man:D-GlcA:D-Xyl:Ac |
|---|---|---|---|---|---|
| TAG | 624.0 | 1.24 | 24.9 | 20.1 | 3.03:1.00:0.98:0.50 |
| LTAG-1 | 19.3 | 1.52 | 0.31 | 21.3 | 3.01:1.03:1.02:0.51 |

It is shown from the detection results in Table 1 that, compared with TAG, the molecular weight and the intrinsic viscosity of LTAG-1 are reduced significantly, while the composition of monosaccharides and the content of acetyl remain stable (the molar ratio was about 3:1:1:0.5).

Figure 2:
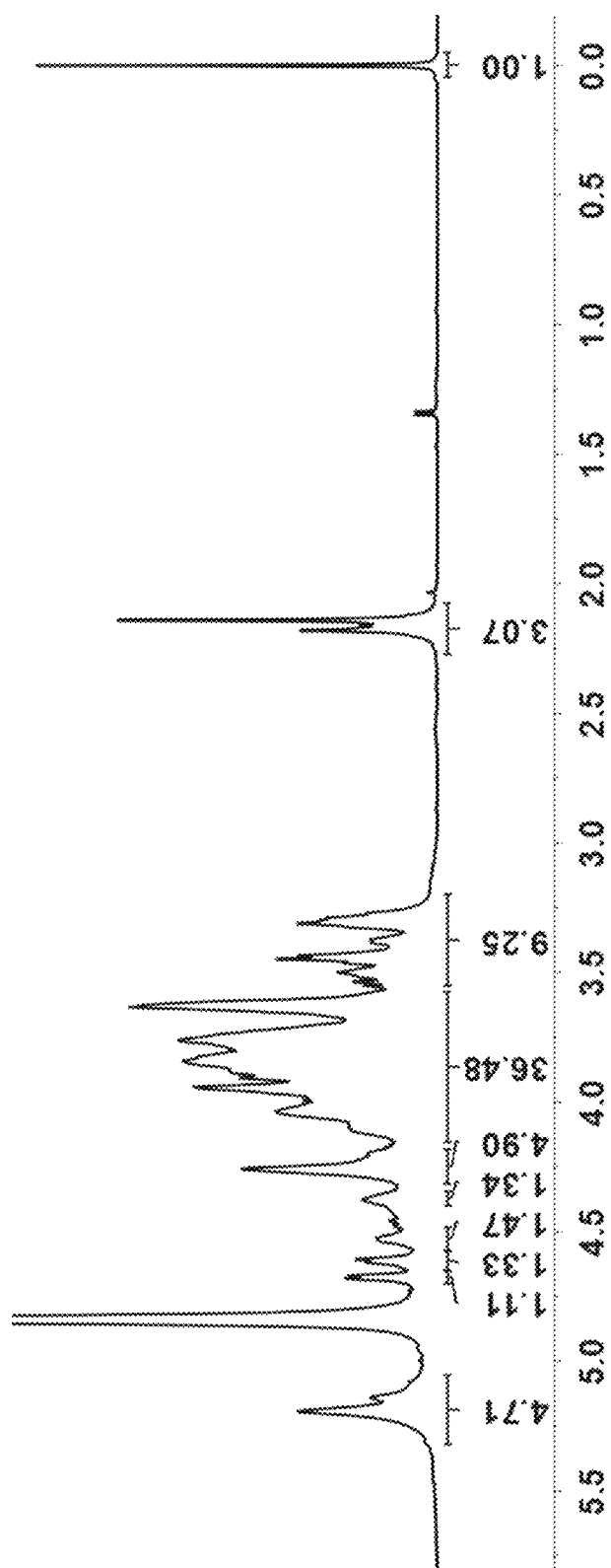
FIG. 2 shows the $^1H$ NMR spectrum of LTAG.
Figure 3:
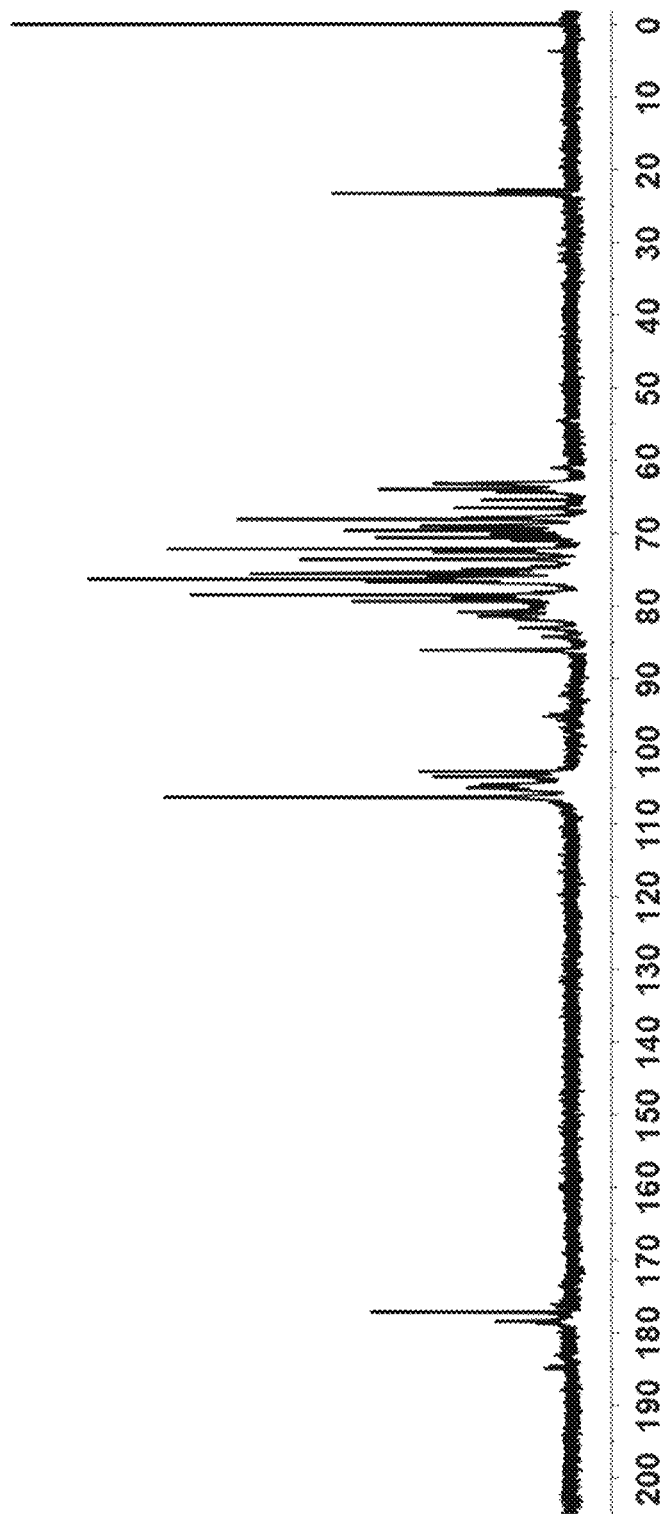
FIG. 3 shows the $^{13}C$ NMR spectrum of LTAG.
Figure 4:
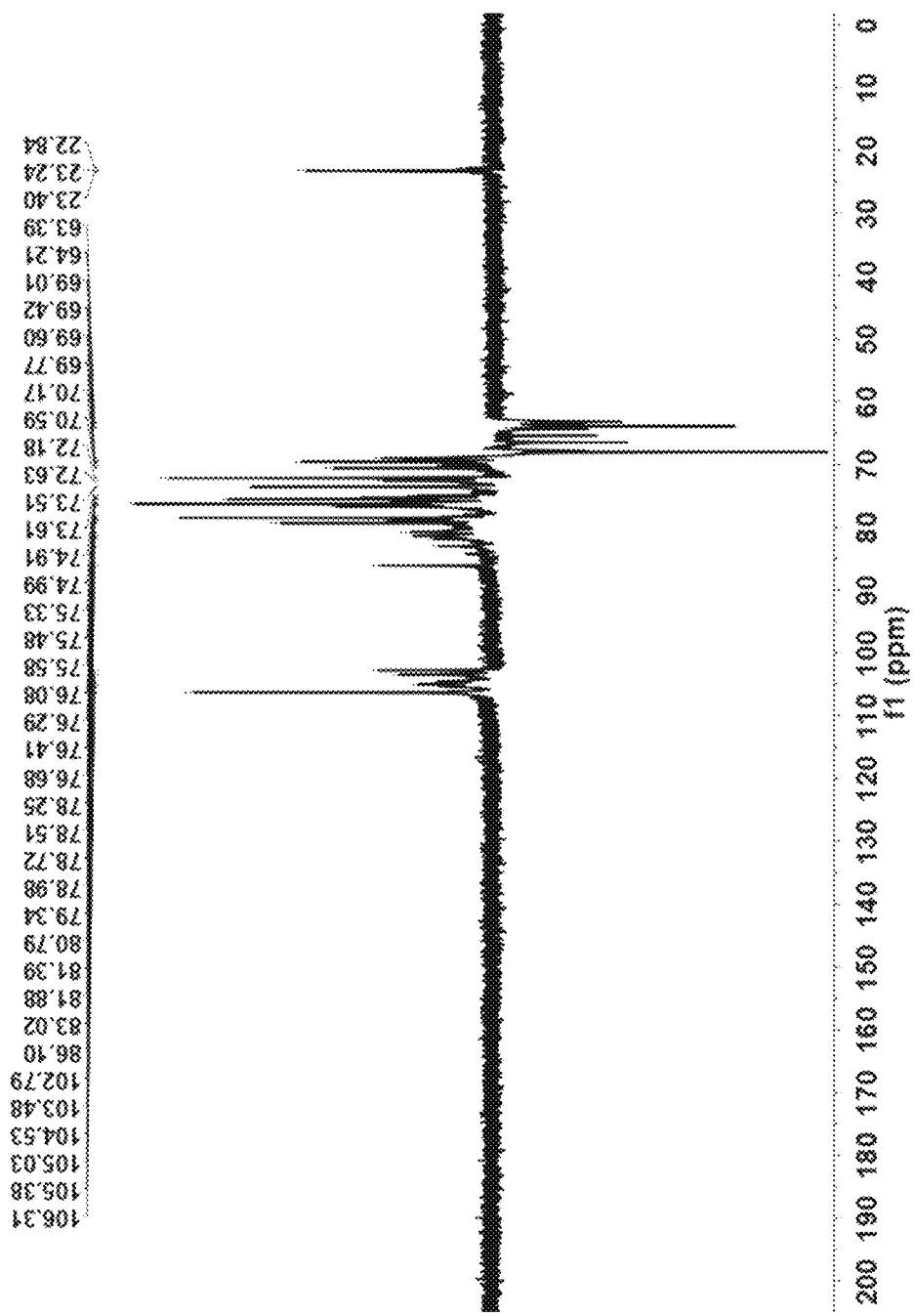
FIG. 4 shows the DEPT135° spectrum of LTAG.

With LTAG-1 as an example, the signal assignment and structural analysis are illustrated briefly. The $^1H/^{13}C$ NMR spectra of LTAG-1 are shown in FIGS. 2-3 and FIG. 4, and their signal assignment data are shown in Table 2.

Figure 5:
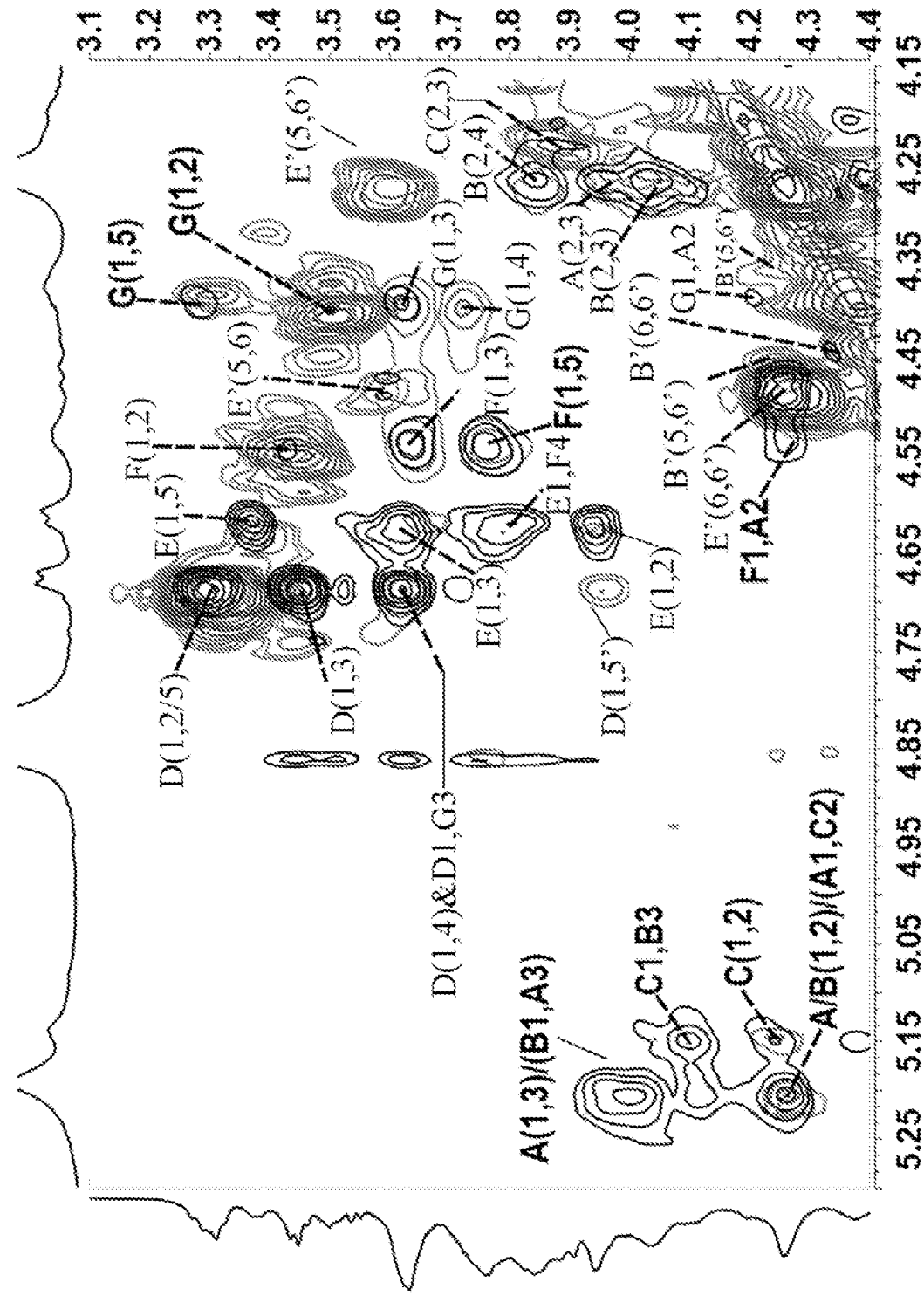
FIG. 5 shows the superimposed spectra of $^1H$—$^1H$ COSY, TOCSY and ROESY anomeric hydrogen signaling regions of LTAG.

As shown in FIG. 5, which shows $^1H-^1H$ COSY, TOCSY, and ROESY spectra, the prepared depolymerized product LTAG-1 contains seven groups of spin-coupled systems. Signals at low-field regions 5.14, 5.19, 5.19 ppm are α-terminal hydrogen signals at the free terminals of α-1,2-Man, α-1,3-Man and α-1,2,3-Man saccharide residues on the backbone respectively. The β-terminal hydrogen signals occur at about 4.3-4.7 ppm. Where, signals at 4.38, 4.52, 4.61, 4.67 ppm respond to β-1,3-xyl, β-1,4-glcA, β-T-Man and β-T-Xyl respectively. The proton of acetyl occurs at about 2.1-2.2 ppm. $^1H-^1H$ NOESY spectra shows the coupling between terminal hydrogen of α-1,2,3-Man and its own H3 and the coupling between terminal hydrogen of α-1,2,3-Man and H3 of α-1,2-Man; the coupling between terminal hydrogen of α-1,3-Man and H3 of α-1,2,3-Man; the coupling between terminal hydrogen of α-1,2-Man and H3 of α-1,3-Man; the coupling between the terminal hydrogen of β-1,3-xyl, β-1,4-glcA and H2 of α-1,2,3-Man respectively; the coupling between the terminal hydrogen of β-T-Xyl and H3 of β-1,3-xyl; and the coupling between the terminal hydrogen of β-T-Man and H3 of β-1,4-glcA. The results show the linkage between monosaccharides: Man are linked with each other through α(1→2) and α(1→3) glucosidic bonds to form a backbone, β(1→4) glucosidic bond is linked between Man and GlcA to form a branched chain which is linked to position 2 on the backbone of Man, and the other two Xyl are linked through β(1→3) glucosidic bond to form a branched chain which is linked to position 2 on the backbone of Man.

Figure 6:
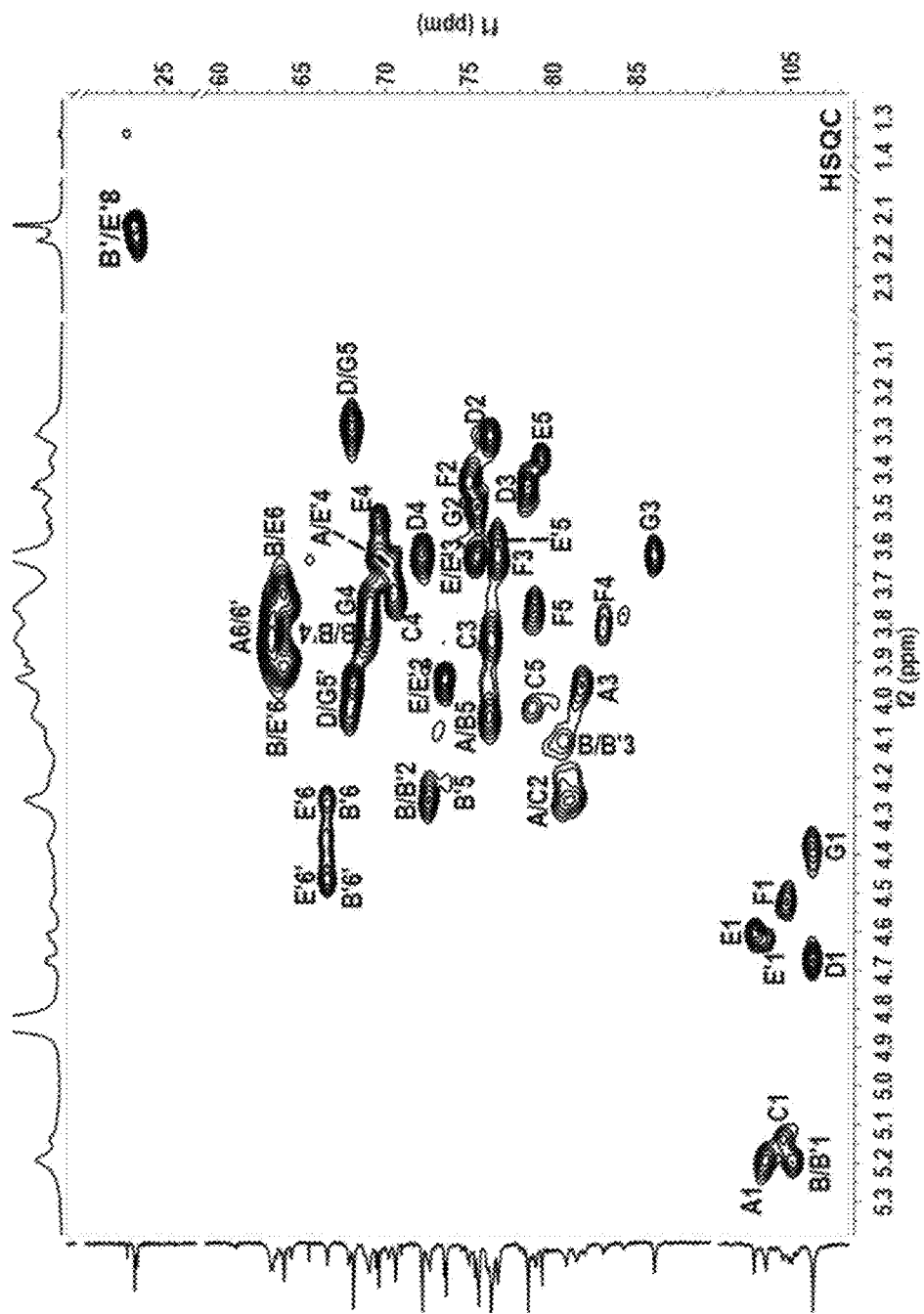
FIG. 6 shows the $^1H$—$^1H$ HSQC spectrum of LTAG.

As shown in FIG. 6, which shows $^1H-^{13}C$ HSQC spectra, it can be judged that C1 peaks of α-1,2-Man, α-1,3-Man, α-1,2,3-Man, β-1,3-Xyl, β-1,4-glcA, β-T-Man and β-T-Xyl in the $^{13}C$-NMR spectra occur at 104.57, 105.10, 103.51, 106.28, 104.74, 104.74 and 106.29 ppm respectively. The carbonyl carbon (C6) in GlcA carboxyl group and the carbonyl carbon (C7) in acetyl occur at almost the same position, 178.2 and 177.2 ppm respectively.

Figure 7:
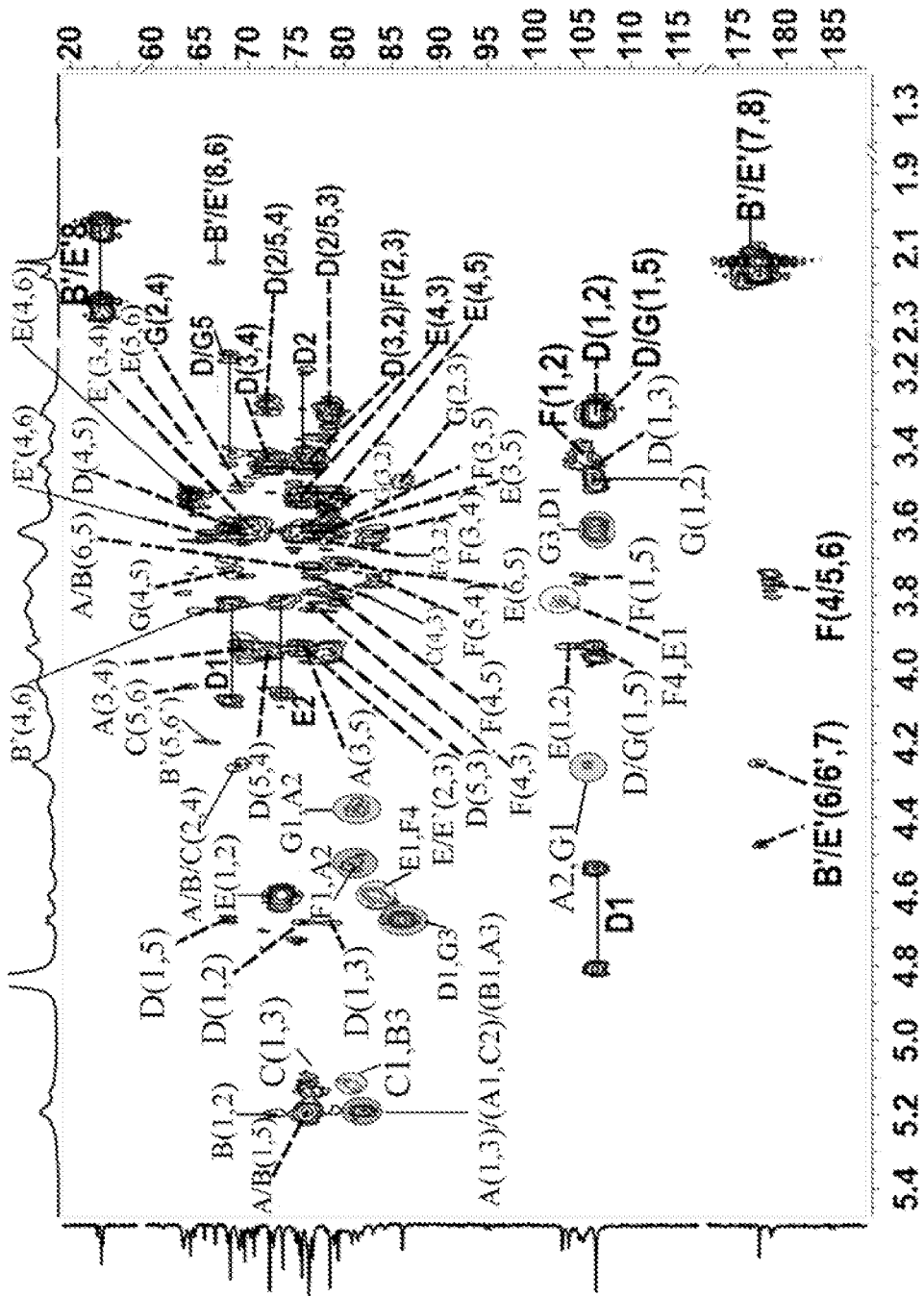
FIG. 7 shows the $^1H$—$^{13}C$ HMBC spectrum of LTAG.

As shown in FIG. 7, which shows $^1H-^{13}C$ HMBC spectra, it can be seen the coupling between H1 of α-1,2,3-Man and its own C3 and the coupling between H1 of α-1,2,3-Man and C3 of α-1,2-Man; the coupling between H1 of α-1,3-Man and C3 of α-1,2,3-Man; the coupling between H1 of α-1,2-Man and C3 of α-1,3-Man; the coupling between H1 of β-1,3-Xyl, β-1,4-GlcA and C2 of α-1,2,3-Man respectively; the coupling between H1 of β-T-Xyl and C3 of β-1,3-Xyl; and the coupling between H1 of β-T-Man and C3 of β-1,4-GlcA. Thus, it can be further confirmed that LTAG-1 constitutes the linkage between monosaccharides. According to the signal changes before and after deacetylation, it can be known that LTAG-1 acetyl substitution is located on the OH group at position 6 of Man.

TABLE 2

$^1H/^{13}C$ NMR detection data (δ[ppm]) of LTAG-1 prepared from *Tremella aurantialba* fruiting bodies TAG

| Saccharide residues | Chemical shift (ppm) | | | | | | | |
|---|---|---|---|---|---|---|---|---|
|  | C1/H1 | C2/H2 | C3/H3 | C4/H4 | C5/H5 | C6/H6 | C7/H7 | C8/H8 |
| A (α-1,2,3-Man) | 103.51*<br>5.19 | 81.03<br>4.26 | 81.73<br>3.96 | 69.66<br>3.64 | 76.19<br>4.05 | 63.22<br>3.75/3.85 | | |
| B (α-1,3-Man) | 105.10<br>5.19 | 72.57<br>4.26 | 80.64<br>4.11 | 69.07<br>3.81 | 76.18<br>4.05 | 63.92<br>3.72/3.91 | | |
| B' (α-1,3-Man) | 105.10<br>5.19 | 72.57<br>4.26 | 80.64<br>4.11 | 69.07<br>3.86 | 73.68<br>4.20 | 66.52<br>4.36/4.43 | 177.20 | 23.50<br>2.18 |
| C (α-1,2-Man) | 104.57<br>5.14 | 81.21<br>4.23 | 76.19<br>3.84 | 70.50<br>3.72 | 78.76<br>4.02 | 63.89<br>3.72/3.91 | | |
| D (β-T-Xyl) | 106.29<br>4.67 | 76.26<br>3.31 | 78.49<br>3.44 | 72.13<br>3.63 | 67.99<br>3.29/3.95 | | | |
| E (β-T-Man) | 102.84<br>4.61 | 73.55<br>3.94 | 75.47<br>3.63 | 69.55<br>3.54 | 79.32<br>3.39 | 64.10<br>3.74/3.91 | | |
| E' (6-O-Ac-β-T-Man) | 103.37<br>4.62 | 73.55<br>3.96 | 75.47<br>3.63 | 70.34<br>3.64 | 76.76<br>3.59 | 66.43<br>4.26/4.47 | 177.26 | 23.30<br>2.15 |
| F (β-1,4-glcA) | 104.74<br>4.52 | 74.98<br>3.43 | 76.70<br>3.62 | 83.00<br>3.81 | 78.91<br>3.76 | 178.16 | | |
| G (β-1,3-xyl) | 106.28<br>4.38 | 75.49<br>3.51 | 86.05<br>3.62 | 69.08<br>3.74 | 68.06<br>3.29/4.01 | | | |

*Numbers in bold indicate the substitution sites of saccharide residues.

It can be known from the combination of LTAG-1 hydrogen spectrum, carbon spectrum and related spectra, in the present three-component monosaccharide, α-Man are linked with each other through α-(1→2) and α-(1→3) glucosidic bonds to constitute the glycan backbone, and the branched chain is a disaccharide formed from β-Xyl, β-GlcA and β-Man which is linked to position 2 on the backbone of Man. The acetyl substitution site is located on OH at position 6 of Man, but only OH groups at position 6 of a few Man residues are substituted with acetyl, and the molar percentage of acetyl can be calculated from the hydrogen spectrum to be about 10%.

Embodiment 2

Preparation of LTAG with a Series of Molecular Weights

1. Materials and Methods
(1) Materials
*Tremella aurantialba* fruiting bodies-derived TAG was prepared by the same method as that in embodiment 1.
The used reagents including $H_2O_2$, $Cu(CH_3COO)_2 \cdot H_2O$, NaCl, NaOH, ethyl alcohol and the like were all commercial analytically pure reagents.
(2) Methods
1) Preparation of LTAG samples with a series of molecular weights: 2 g *Tremella aurantialba* fruiting bodies-derived TAG, in triplicate, was depolymerized by the method as described in step 2) of embodiment 1, and the time points at which the reaction terminated were 60, 120, 180 min, respectively. The prepared LTAG depolymerized products were desalted through ultrafiltration and exchanged through a cation exchange column, which were numbered as: LTAG-2, LTAG-3 and LTAG-4, respectively. The yields of the depolymerized products were all greater than 75%.
2) Detection of LTAG products: The content of glucuronic acid (D-GlcA) was detected by a sulfuric acid-carbazole method (Zhang Weijie, Biochemical Research Technology of Glycoconjugates. 2nd ed. Zhejiang: Zhejiang University Press, 1999, 11-21). The intrinsic viscosity was determined with an Ubbelohde viscometer following the viscosimetry in the General Chapters 0633 of the Chinese Pharmacopoeia 2015 Volume IV. The molecular weight and the distribution thereof were detected by high-performance gel permeation chromatography (HPGPC), and the composition of monosaccharides was detected by HPLC according to PMP derivatization procedures.
2. Results
The determination results of the resulting series of depolymerized products LTAG-2, LTAG-3, LTAG-4 were shown in Table 3.

TABLE 3

Detection results of physicochemical parameters and the composition of monosaccharides of *Tremella aurantialba* fruiting bodies-derived LTAG

| Samples | Molecular weight (Mw, kDa) | Dispersion coefficient (PDI) | Intrinsic viscosity (0.1M NaCl, dL/g) | Content of uronic acid (%) | Composition of monosaccharides (molar ratio) D-Man:D-GlcA:D-Xyl:Ac |
|---|---|---|---|---|---|
| LTAG-2 | 14.7 | 1.33 | 0.21 | 22.4 | 3.04:1.02:1.03:0.54 |
| LTAG-3 | 11.1 | 1.62 | 0.18 | 20.8 | 3.08:1.12:1.10:0.52 |
| LTAG-4 | 7.3 | 1.46 | 0.11 | 21.7 | 3.01:0.98:0.99:0.50 |

It was shown from the detection results in Table 3 that, the depolymerized products prepared from *Tremella aurantialba* fruiting bodies-derived TAG through a hydrogen peroxide depolymerization method have a narrow molecular weight distribution, of which the content of uronic acid and the composition of monosaccharides did not change significantly, and the intrinsic viscosity decreased with the decrease of the molecular weight.

Embodiment 3

Preparation of LTAG Deacetylated Derivatives

1. Materials and Methods
(1) Materials
*Tremella aurantialba* fruiting bodies-derived TAG and LTAG-1 were prepared by the same method as that in embodiment 1.
The used reagents including NaCl, NaOH, ethyl alcohol, HCl and the like were all commercial analytically pure reagents.
(2) Methods
1) Preparation of LTAG deacetylated samples: 1 g LTAG-1 was added into 10 mL deionized water to form an aqueous solution of LTAG-1, into which was dropwise added 1 mL NaOH aqueous solution of 1 M, and reacted at a temperature of 30° C. for 4 h. At the end of the reaction, 1 M HCl was added to adjust pH to 7.4, small molecular weight impurities were removed by chromatography through a Bio-Gel P2 gel column, and the resulting products were converted into pharmaceutically acceptable salts by a cation exchange column. The deacetylated products were named as LTAG-1a, and the yield was greater than 85%;
2) Detection of LTAG-1a, the deacetylated products of LTAG: The content of glucuronic acid (D-GlcA) was detected by a sulfuric acid-carbazole method (Zhang Weijie, Biochemical Research Technology of Glycoconjugates. 2nd ed. Zhejiang: Zhejiang University Press, 1999, 11-21). The intrinsic viscosity was determined with an Ubbelohde viscometer following the viscosimetry in the General Chapters 0633 of the Chinese Pharmacopoeia 2015 Volume IV. The molecular weight and the distribution thereof were detected by high-performance gel permeation chromatography (HPGPC), and the composition of monosaccharides was detected by HPLC according to PMP derivatization procedures. The molar percentage of acetyl was calculated from the integral area of methyl peak in $^1$H NMR.
2. Results
The determination results of the deacetylated products LTAG-1 a obtained in step 2) were shown in Table 4.

TABLE 4

Detection results of physicochemical parameters and the composition of monosaccharides of LTAG-1a, the deacetylated products of LTAG-1

| Sample | Molecular weight (Mw, kDa) | Dispersion coefficient (PDI) | Intrinsic viscosity (0.1M NaCl, dL/g) | Content of uronic acid (%) | Composition of monosaccharides (molar ratio) D-Man:D-GlcA:D-Xyl:Ac |
|---|---|---|---|---|---|
| LTAG-1a | 18.9 | 1.51 | 0.15 | 21.0 | 3.01:1.03:1.02:0.00 |

It was shown from the detection results in Table 4 that, the deacetylated products LTAG-1 prepared from LTAG-1 through weak alkaline treatment have a narrow molecular weight distribution, of which the content of uronic acid and the composition of monosaccharides did not change, and the intrinsic viscosity decreased significantly with the elimination of acetyl.

Figure 8:
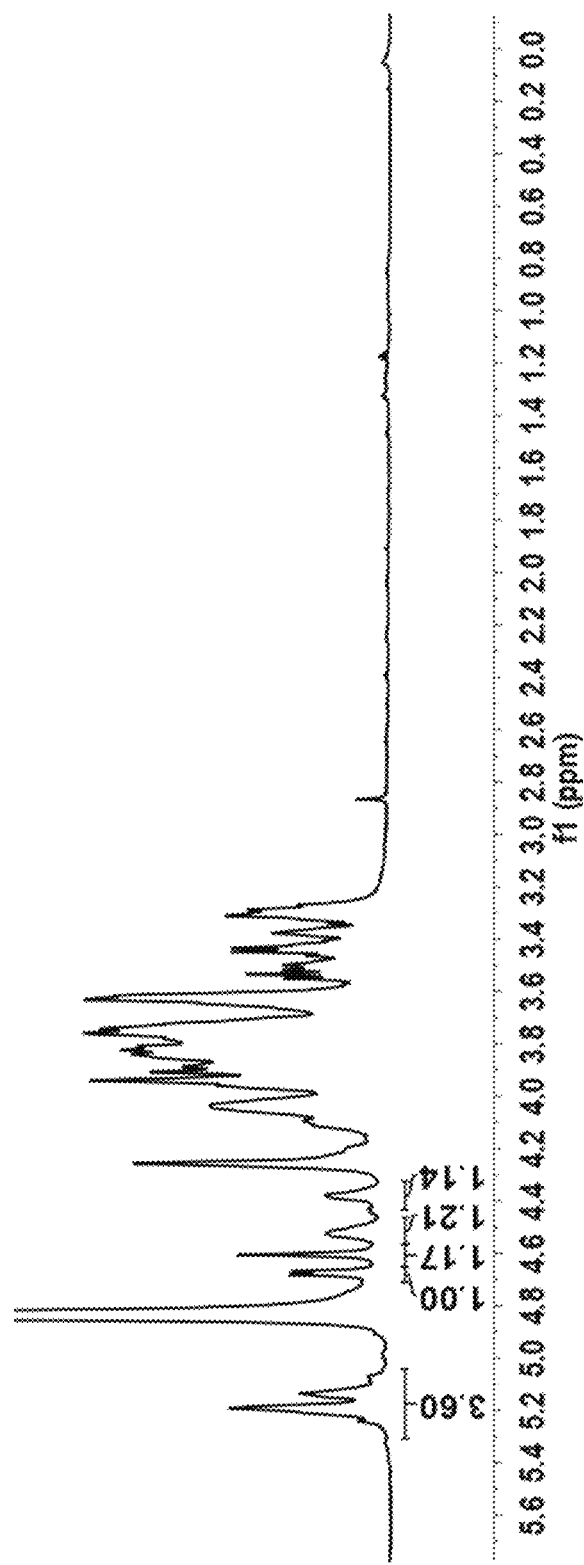
FIG. 8 shows the $^1H$ NMR spectrum of the deacetylated derivative of LTAG.

$^1$H NMR spectrum was shown in FIG. 8, from which it can be seen that, for the deacetylated products LTAG-1a prepared from LTAG-1 through weak alkaline treatment, the acetyl signal peaks at 2.0-2.2 ppm in the hydrogen spectrum disappeared completely, indicating that the deacetylation degree of LTAG-1a was 100%. All the other signal peaks of saccharide residues did not change at all, indicating that weak alkaline treatment did not affect the basic structure of LTAG-1.

Embodiment 4

Immune Activity Of Low-Molecular-Weight
*Tremella aurantialba* glucuronoxylomannan
(LTAG)

1. Materials and Reagents (1) Detection samples: LTAG-1 and LTAG-3 (Mw 19.3 and 11.1 kDa) prepared in embodiment 1 and embodiment 2 were dissolved in water for injection and stored at 4° C.

(2) Reagents: MTT (3-(4,5)-dimethylthiahiazo-2-yl)-2,5-diphenyltetrazoliumbromide), Lipopolysaccharide (LPS) were purchased from Sigma Co.; High-glucose Dulbecco's modified Eagle's medium (DMEM), fetal bovine serum (FBS), penicillin, and streptomycin were purchased from HyClone Co; IL-1β ELISA kit was purchased from BD Biosciences Co.; TNF-α ELISA kit was purchased from Shenzhen Xinbosheng Biological Technology Co., Ltd.; NO detection kit was purchased from Progema Co.; AntiTLR$_2$ (6C2) monoclonal antibodies and Anti-TLR$_4$ (MTS510) monoclonal antibodies were purchased from eBioscience Co.

(3) Cells: RAW264.7 cells are purchased from China Center for Type Culture Collection. The cells were all cryopreserved and resuscitated by conventional methods.

2. Experimental Methods (1) Detection on the cell viability of RAW264.7 by *Tremella aurantialba* polysaccharides: A suspension of RAW264.7 cells ($1\times10^6$/mL) at the logarithmic growth phase was inoculated in a 96-well plate, and cultivated at 37° C. and 5% $CO_2$ overnight. The supernatant was discarded, then different concentrations of *Tremella aurantialba* polysaccharides were added and cultivated at 37° C. and 5% $CO_2$ for 24 h, and the cytotoxicity was detected by a MTT method. OD values were determined by a Tecan microplate reader, and the cell viability was calculated.

(2) Effects of *Tremella aurantialba* polysaccharides on the release of NO and cytokines from RAW264.7: A suspension of RAW264.7 cells ($5\times10^5$/mL) at the logarithmic growth phase was inoculated in a 6-well plate, and cultivated at 37° C. and 5% $CO_2$ overnight. The supernatant was discarded, then different concentrations of *Tremella aurantialba* polysaccharides were added and cultivated at 37° C. and 5% $CO_2$ for 24 h, and then the contents of NO and cytokines were detected by a kit.

(3) Detection of membrane receptors: A suspension of RAW264.7 cells ($4\times10^5$/mL) at the logarithmic growth phase was inoculated in a 6-well plate, and cultivated at 37° C. and 5% $CO_2$ overnight. The supernatant was discarded, then 10 μg/mL of antibodies were added to be pretreated for 2 h, then 100 μg/mL of *Tremella aurantialba* polysaccharides were added for incubation for 24 h, and the contents of NO and cytokines were detected by a kit.

Figure 9:
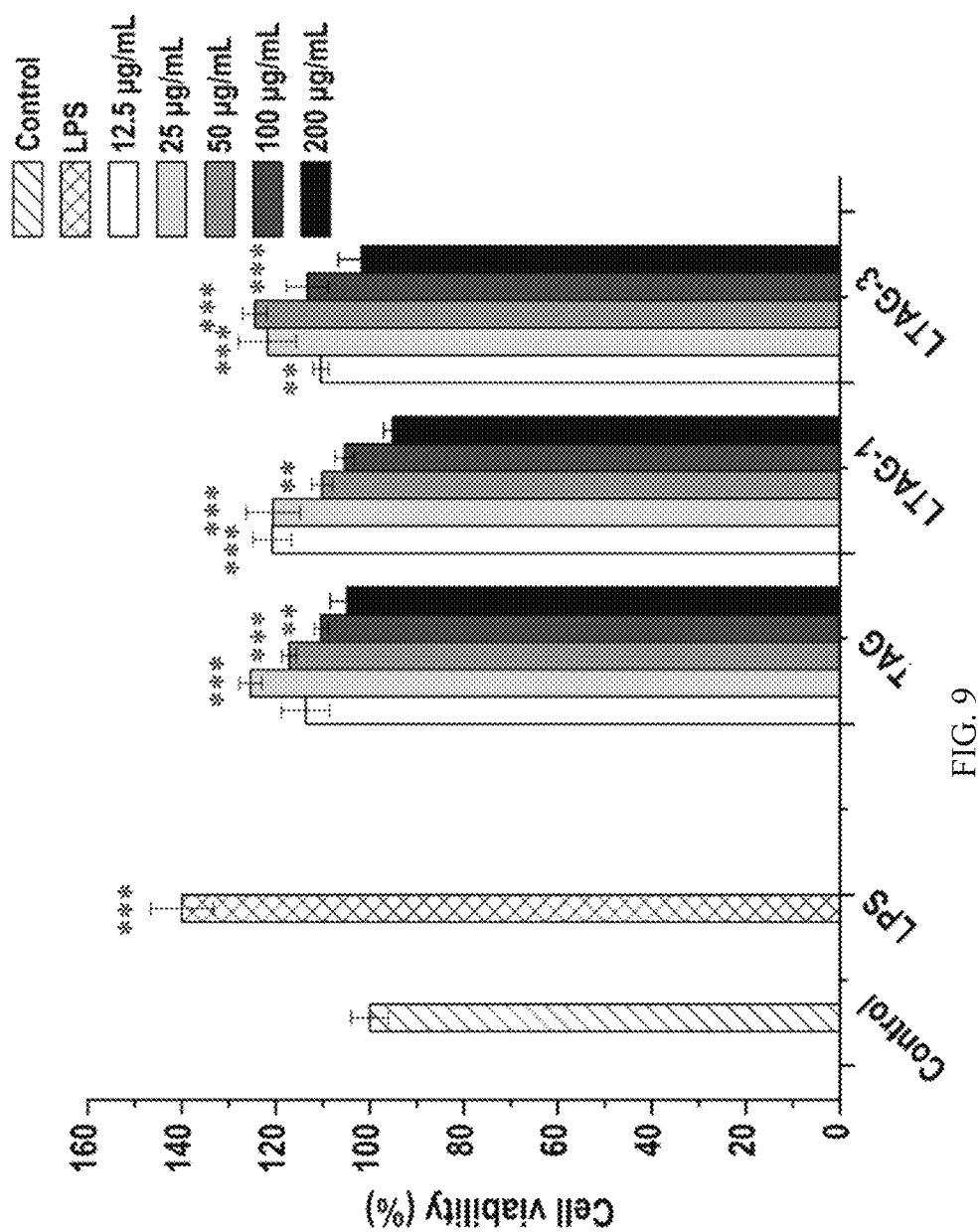
FIG. 9 shows the effects of LTAG on the proliferation of macrophagocytes, showing that LTAG can cause macrophagocytes to proliferate.

3. Experimental Results (1) Effect of LTAG on the viability of macrophagocytes: As shown from the results in FIG. 9, LTAG-1 and LTAG-3 can significantly promote the proliferation of macrophagocytes within the experimental dosage range; and no significant cytotoxicity was observed at the maximum concentration of the formulated drug (200 μg/ml).

Figure 10:
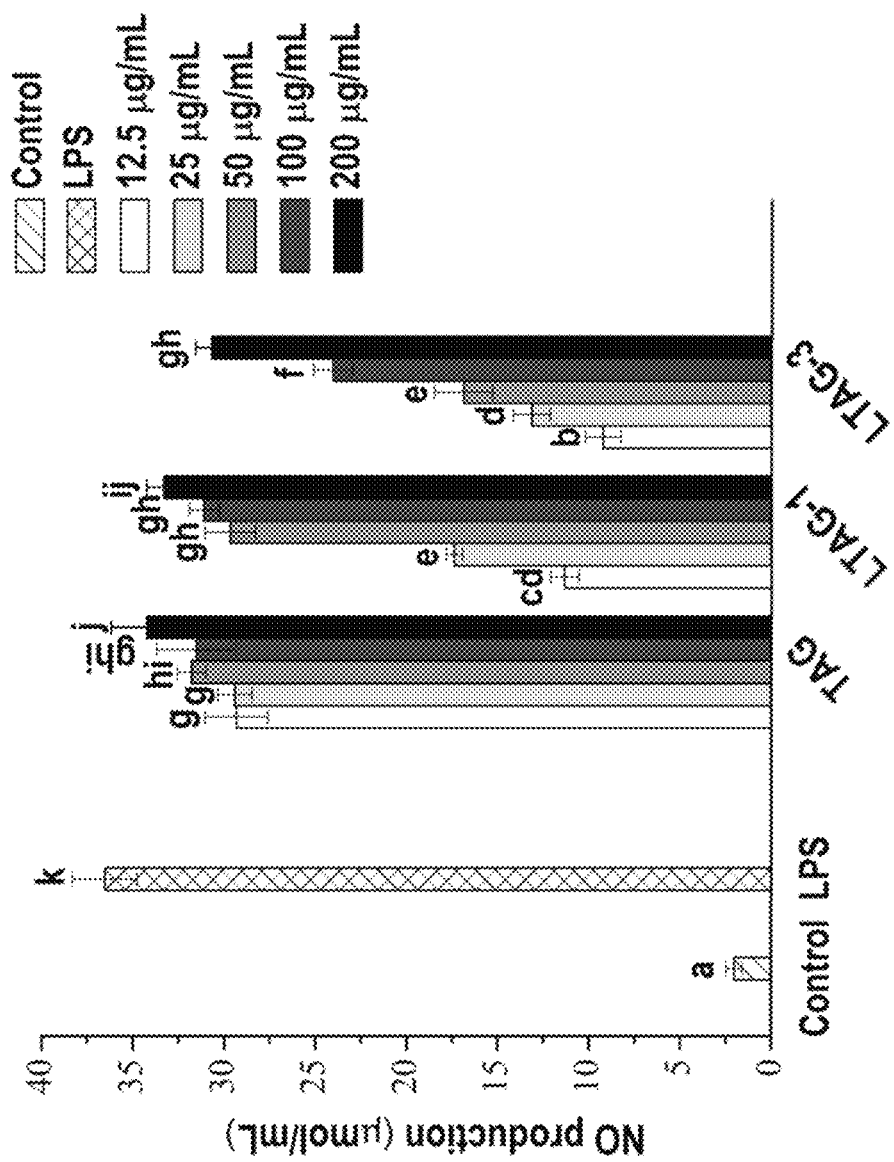
FIG. 10-FIG. 12 show the effects of LTAG on NO, IL-1β, TNF-α, showing that LTAG can stimulate the production of NO, IL-1β, and TNF-α.
Figure 11:
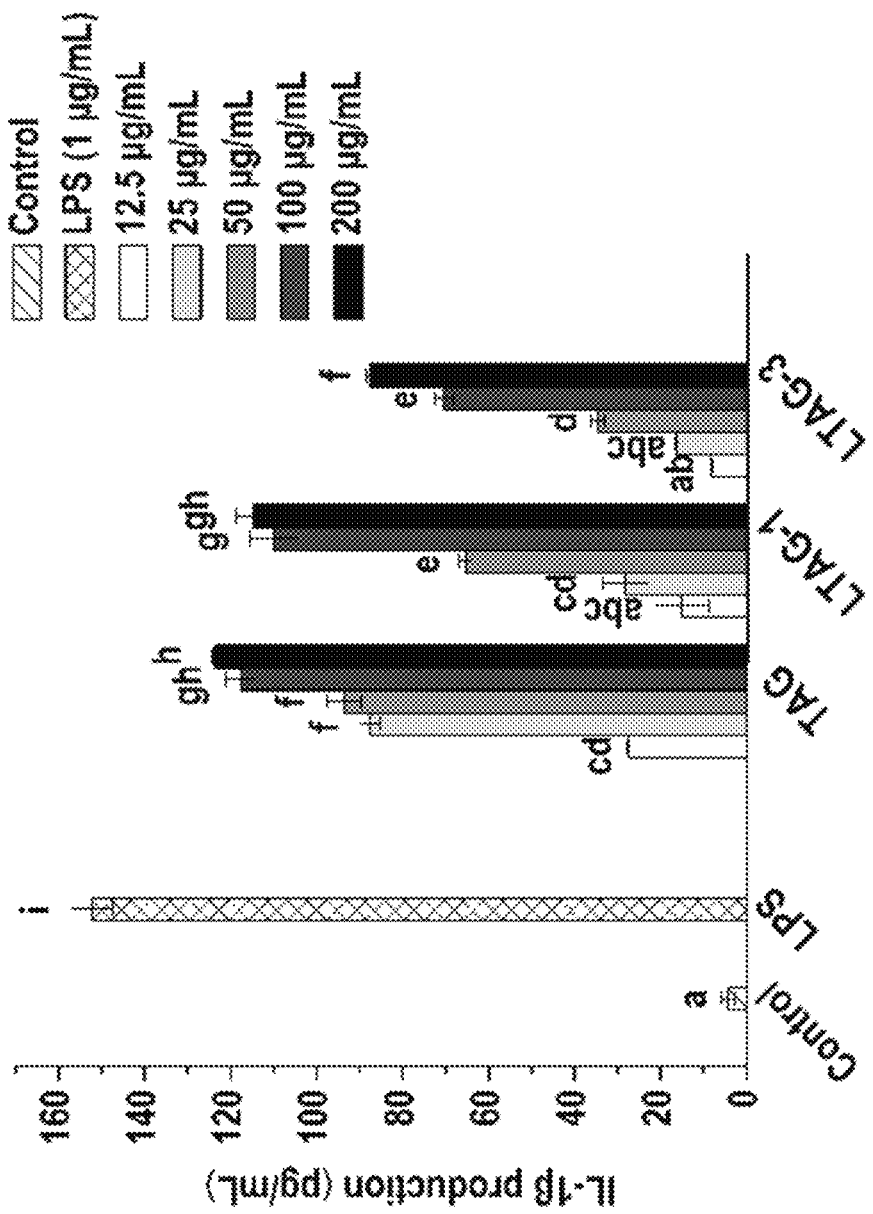
Figure 12:
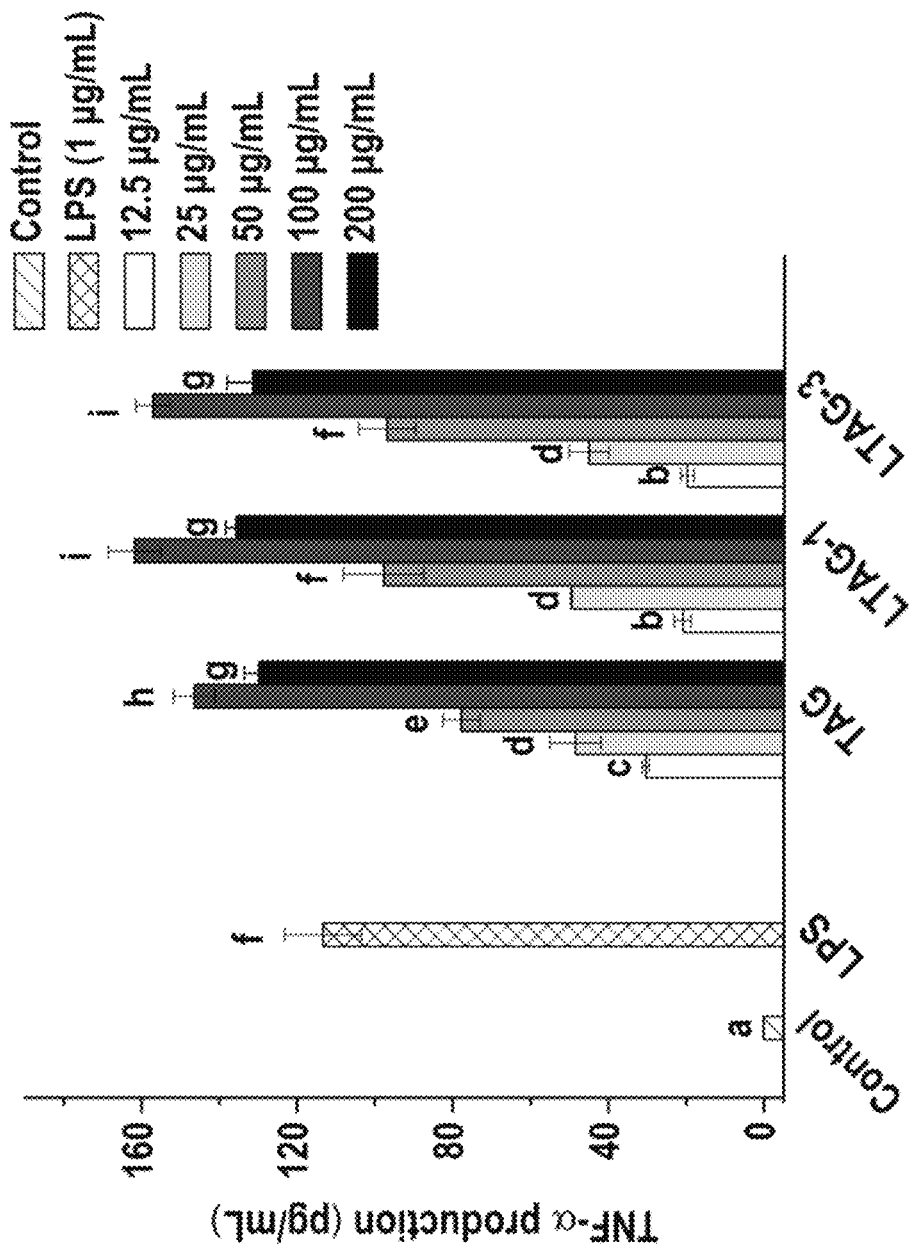

(2) Effect of LTAG on immune factors: As shown from the results in FIGS. 10-12, both LTAG-1 and LTAG-3 can significantly promote the macrophagocytes to secrete NO, IL-1β and TNF-α within the experimental dosage range, and the effect was more obvious at high concentrations, comparable with that of the positive control group. There was no significant difference between the level at which LTAG-1 promoted the macrophagocytes to secrete NO, IL-1β and TNF-α at concentrations of 100-200 μg/ml and that of the native TAG, indicating that the depolymerized product LTAG-1 can retain the immune-enhancing activity of the native TAG well.

Figure 13:
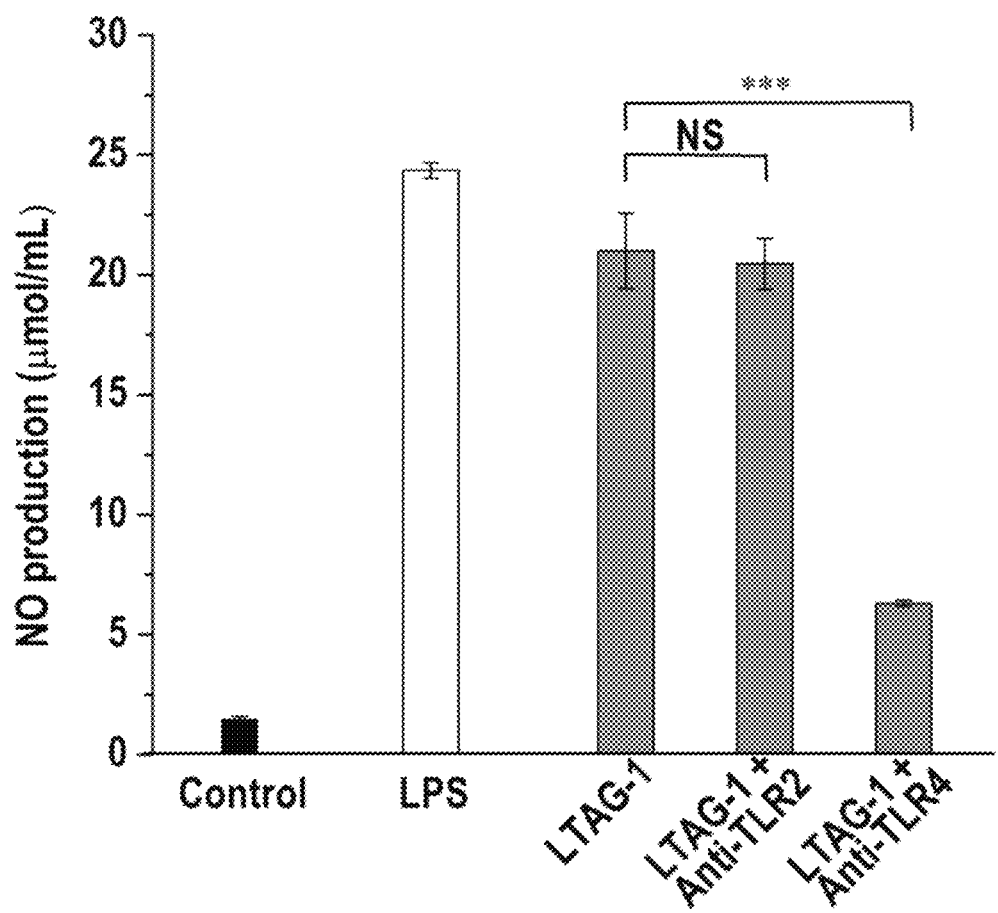
FIG. 13-FIG. 15 are data graphs showing the effects of LTAG on the level of cytokines at the presence or absence of anti-$TLR_4$ antibodies, showing that the membrane receptor on which LTAG acts is $TLR_4$.
Figure 14:
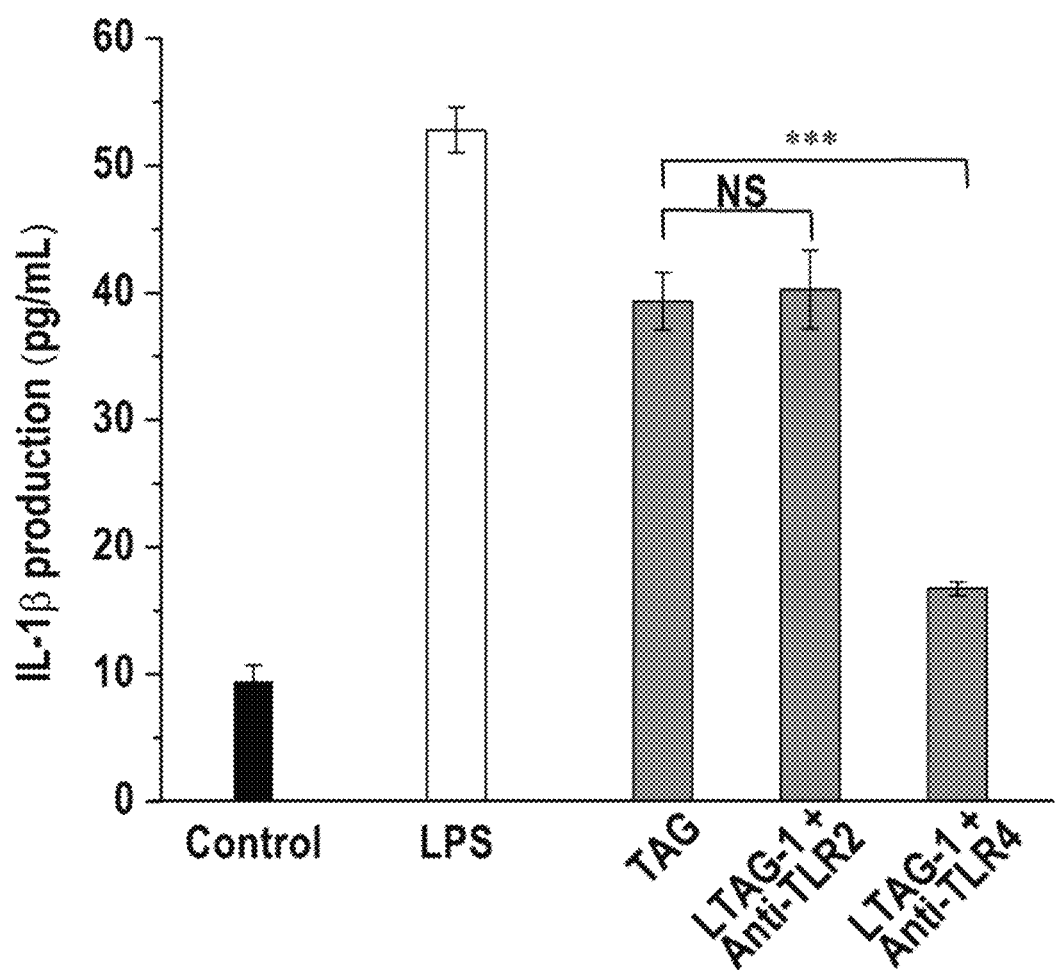
Figure 15:
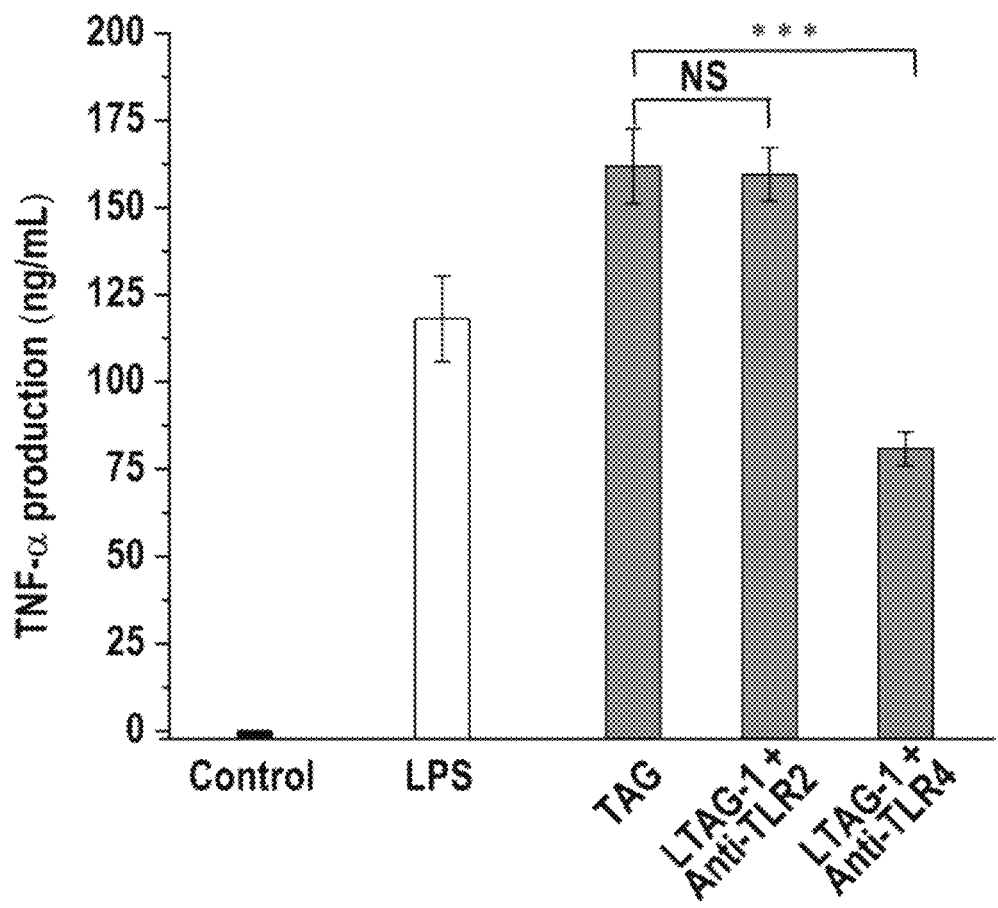

(3) Membrane receptors with the immune-enhancing activity of LTAG: As shown from the results in FIGS. 13-15, the level at which LTAG-1 promoted the macrophagocytes to secrete NO, IL-1β and TNF-α in the presence of the antibody Anti-TLR$_4$ was reduced obviously, but there were no influences observed in the presence of the antibody Anti-TLR2, indicating that TLR$_4$ was the membrane receptor on which LTAG would affect the macrophagocytes.

The foregoing is only preferable implementation of the present disclosure. It should be noted to persons with ordinary skills in the art that several improvements and modifications can be made without deviating from the principle of the present disclosure, which are also considered as the protection scope of the present disclosure.

What is claimed is:

1. A low-molecular-weight *Tremella aurantialba* glucuronoxylomannan, wherein, the low-molecular-weight *Tremella aurantialba* glucuronoxylomannan is a mixture of homologous glucuronoxylomannan derivatives, its structural formula is as below:

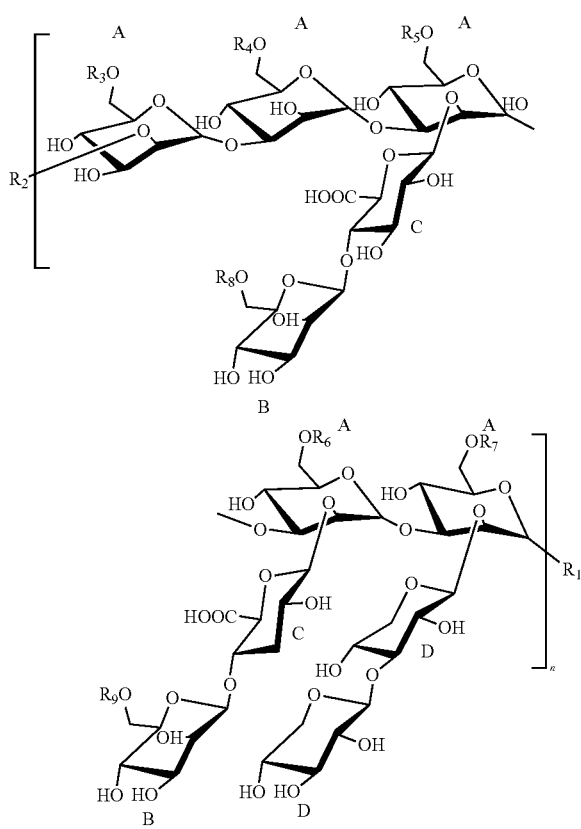

In the structural formula,
A is α-D-mannos-1-yl;
B is β-D-mannos-1-yl;
C is β-D-glucuron-1-yl;
D is β-D-xylos-1-yl;
$R_1$ is —OH or -2-O-α-D-mannose;
$R_2$ is —H;
$R_3$, $R_4$, $R_5$, $R_6$, $R_7$, $R_8$, $R_9$ are, independently of one another, —H or —COCH$_3$;
when $R_3$, $R_4$, $R_5$, R6, $R_7$, $R_8$ and $R_9$ are all —H, the compound is a deacetylated derivative of the low-molecular-weight *Tremella aurantialba* glucuronoxylomannan;
wherein a weight-average molecular weight of the low-molecular-weight *Tremella aurantialba* glucuronxylomannan is in a range of 8,000-24,000 Da.

2. The low-molecular-weight *Tremella aurantialba* glucuronoxylomannan according to claim 1, wherein, on the basis of molar percentage, the compound in which $R^1$ is —OH accounts for more than 90% the total amount of the low-molecular-weight *Tremella aurantialba* glucuronoxylomannan.

3. The low-molecular-weight *Tremella aurantialba* glucuronoxylomannan according to claim 1, wherein, in the low-molecular-weight *Tremella aurantialba* glucuronoxylomannan, the molar percentage of acetyl is 10%.

4. The low-molecular-weight *Tremella aurantialba* glucuronoxylomannan according to claim 1, wherein, on the basis of molar ratio, the molar ratio of the three monosaccharide residues, mannose, glucuronic acid and xylose, contained in the low-molecular-weight *Tremella aurantialba* glucuronoxylomannan to the contained —COCH$_3$ is 3:(1±0.3):(1±0.3):(0.5±0.05).

5. The low-molecular-weight *Tremella aurantialba* glucuronoxylomannan according to claim 4, wherein, on the basis of molar ratio, the molar ratio of the three monosaccharide residues, mannose, glucuronic acid and xylose, contained in the low-molecular-weight *Tremella aurantialba* glucuronoxylomannan to the contained —COCH$_3$ is 3.01:0.98:0.99:0.5, 3.04:1.02:1.03:0.54 or 3.08:1.12:1.10:0.52.

6. The low-molecular-weight *Tremella aurantialba* glucuronoxylomannan according to claim 1, wherein, the mole number of —COCH$_3$ contained in the deacetylated derivative of the low-molecular-weight *Tremella aurantialba* glucuronoxylomannan is 0.

7. The low-molecular-weight *Tremella aurantialba* glucuronoxylomannan according to claim 1, wherein, the n is an integer with a mean of 4-12.

8. The low-molecular-weight *Tremella aurantialba* glucuronoxylomannan according to claim 7, wherein, the mean of n is 5-10.

9. The low-molecular-weight *Tremella aurantialba* glucuronoxylomannan according to claim 1, wherein, the polydispersity index of the low-molecular-weight *Tremella aurantialba* glucuronoxylomannan is 1.0-2.0.

10. The low-molecular-weight *Tremella aurantialba* glucuronoxylomannan according to claim 1, wherein, the viscosity of the low-molecular-weight *Tremella aurantialba* glucuronoxylomannan is 0.05-0.50 dL/g.

11. The low-molecular-weight *Tremella aurantialba* glucuronoxylomannan according to claim 1, wherein, the low-molecular-weight *Tremella aurantialba* glucuronoxylomannan is the depolymerized products of *Tremella aurantialba* glucuronoxylomannan extracted from Basidiomycotina Hymenomycetes Tremella *Tremella aurantialba* fruiting bodies, fermented mycelium or their fermentation broth.

12. A preparation method of the low-molecular-weight *Tremella aurantialba* glucuronoxylomannan according to claim 1, wherein: the preparation method comprises the following steps:
(1) Extracting total polysaccharide of *Tremella aurantialba*, i.e., *Tremella aurantialba* glucuronoxylomannan from Basidiomycotina Hymenomycetes Tremella *Tremella aurantialba* fruiting bodies, fermented mycelium or their fermentation broth;
(2) Depolymerizing the *Tremella aurantialba* glucuronoxylomannan obtained from the step (1) with a peroxide, so as to obtain its low-molecular-weight depolymerized product, i.e., the low-molecular-weight *Tremella aurantialba* glucuronoxylomannan.

13. The preparation method according to claim 12, wherein, the depolymerization of *Tremella aurantialba* glucuronoxylomannan with a peroxide in the step (2) is carried out specifically as below: The *Tremella aurantialba* glucuronoxylomannan obtained from the step (1) is dissolved in deionized water to obtain an aqueous solution with a mass fraction of 0.05-10%, then a metal ion catalyst with a mass fraction of 0.05-0.5% and a peroxide with a mass fraction of 1-6% are added into the resulting aqueous solution and react at a temperature of 25-55° C.; during the reaction, a HPGPC detection is performed; when it is detected that the molecular weight of the depolymerized product reaches the weight-average molecular weight range, a metal ion chelator is added to terminate the reaction; the depolymerized product is then precipitated by adding ethyl alcohol or acetone and collected by centrifugation, and then desalted by ultrafiltration, dialysis or gel permeation chromatography, thus obtaining the low-molecular-weight *Tremella aurantialba* glucuronoxylomannan.

14. The preparation method according to claim 13, wherein, the peroxide with a mass fraction of 1-6% is replaced with a peroxide with a mass fraction of 10%.

15. The preparation method according to claim 13, wherein, the time point to terminate the reaction is 30 min, 60 min, 120 min or 180 min.

16. The preparation method according to claim 13 wherein, the metal ion catalyst is cupric acetate.

17. The preparation method according to claim 13 wherein, the peroxide is hydrogen peroxide; the metal ion chelator is EDTA-2Na.

18. The preparation method according to claim 13, wherein, during the reaction at a temperature of 25-55° C., a sodium hydroxide solution of 1 mol/L is used to control the pH value in a range of 5.0-6.0.

19. A method of preparing the deacetylated derivative of the low-molecular-weight *Tremella aurantialba* glucuronoxylomannan according to claim 1, wherein, the method comprises the following steps:
1) Extracting total polysaccharide of *Tremella aurantialba*, i.e., *Tremella aurantialba* glucuronoxylomannan from Basidiomycotina Hymenomycetes Tremella *Tremella aurantialba* fruiting bodies, fermented mycelium or their fermentation broth;
2) The low-molecular-weight *Tremella aurantialba* glucuronoxylomannan obtained from the step 1) is formulated into an aqueous solution with a mass fraction of 0.05-10%, into which is then added a NaOH solution with a final concentration of 0.05-0.5 M and reacted at a temperature of 10-40° C. for 0.5-6 h; at the end of the reaction, hydrochloric acid is added to adjust pH to 6.5-7.5, and small molecular weight impurities are removed through dialysis, ultrafiltration or gel column chromatography, thus obtaining the deacetylated derivative of the low-molecular-weight *Tremella aurantialba* glucuronoxylomannan.

\* \* \* \* \*